United States Patent [19]

McDonald

[11] Patent Number: 5,203,066
[45] Date of Patent: Apr. 20, 1993

[54] METHOD OF REPAIRING LARGE ROTATING MACHINES IN WHICH PARTS ARE BOLTED TOGETHER THROUGH RADIALLY EXTENDING FLANGES

[75] Inventor: Daniel McDonald, Beaconsfield, Canada

[73] Assignee: Svedala, Inc., Milwaukee, Wis.

[21] Appl. No.: 779,522

[22] Filed: Oct. 18, 1991

[51] Int. Cl.$^5$ ............................................... B23P 6/00
[52] U.S. Cl. ................... 29/402.11; 29/402.06; 29/402.12; 29/402.18
[58] Field of Search ............ 29/402.06, 402.11, 402.12, 29/402.01, 402.03, 402.04, 402.08, 402.09, 402.13, 402.16, 402.18, 401.1; 403/337

[56] References Cited

U.S. PATENT DOCUMENTS

| | | |
|---|---|---|
| 837,767 | 12/1906 | Aims .............................. 403/337 X |
| 3,185,511 | 5/1965 | Wochner et al. .................... 403/337 |
| 4,274,755 | 6/1981 | Bernasconi .......................... 403/337 |

Primary Examiner—Joseph M. Gorski
Attorney, Agent, or Firm—Robert B. Benson

[57] ABSTRACT

A method of repairing large rotating parts joined together by bolts extending through flanges extending radially from the parts being joined. The method comprises the steps of removing the bolts, separating the parts, counterboring the areas around the bolt holes, inserting an annular washer in the area counterbored and rebolting the parts together.

3 Claims, 2 Drawing Sheets

METHOD OF REPAIRING LARGE ROTATING MACHINES IN WHICH PARTS ARE BOLTED TOGETHER THROUGH RADIALLY EXTENDING FLANGES

BACKGROUND OF THE INVENTION

1. Field of the Invention

This invention relates to a method of repairing large rotating machinery such as grinding mills in the field, thereby avoiding the high cost of returning the parts to the factory or a service facility for repair.

2. Description of the Prior Art

Large rotating equipment such as a grinding mill is frequently made of several parts bolted together. These parts may be as large as 36 feet in diameter and 160 feet long weighing over 150 tons. Individual parts such as a shell could weigh up to 100 tons. These parts are usually joined by bolts extending through circumferentially spaced hole in radially extending flanges. After years of use the joints between the parts wear due to friction or erosion and have to be repaired to avoid a failure of the joints that could destroy the machine. In the past when a weakening of the joint was detected, the parts were disassembled and returned to a service shop or the factory for repair. The repair consisted of machining the worn surfaces of the facing flanges to produce a smooth surface to abut the mating surface of the other flange to provide a seal and a maximum transfer of forces from the driving part of the machine to the driven part. The dismantling and shipping of these massive parts to service centers was both time-consuming and expensive. Further, the use of specialized equipment at the site to machine the flange surfaces, if available, is very expensive.

SUMMARY OF THE INVENTION

This invention contemplates a procedure for repairing bolted joints between parts of large rotating machines in the field, thereby reducing substantially the downtime and expense required in repairing the machine. This is accomplished by separating the parts and counterboring the worn areas in the facing flange surfaces around the bolt holes only. The voids created by counterboring are filled by an annular washer and the parts rebolted to form a joint between the flanges. Any remaining space between the worn surfaces of the flanges can be filled by an appropriate plastic material to prevent further wear or erosion between the flanges.

Therefore, it is the object of this invention to provide a new and improved method of repairing large rotating machinery.

A further object is to provide a new and improved method for repairing in the field the joints between parts of large rotating machines joined together by bolts extending through radially extending flanges on adjacent parts.

Further objectives and advantages of this invention will be apparent from the following description when taken in conjunction with the accompanying drawings in which:

DESCRIPTION OF THE PREFERRED EMBODIMENT

Figure 1:
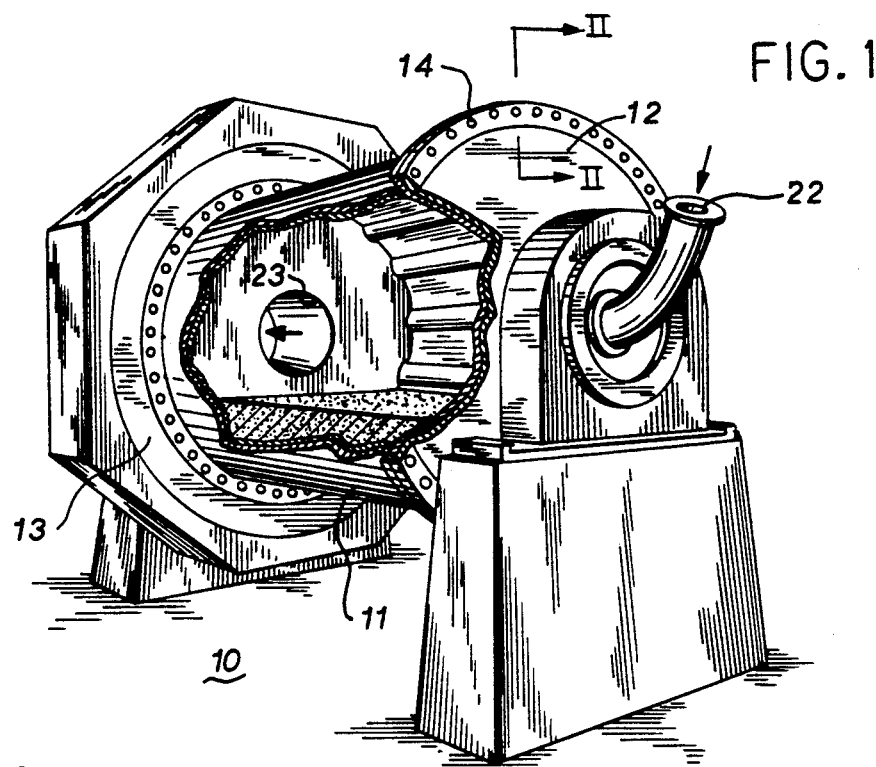
FIG. 1 is a perspective view partially in section of a large rotating grinding mill.
Figure 2:
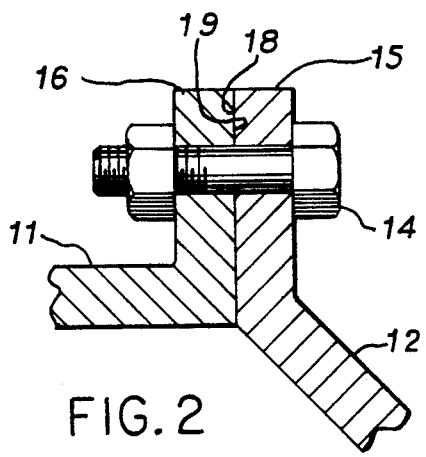
FIG. 2 is a cross section view taken along the line II—II showing the joint between the flanges before any wear occurs.
Figure 3:
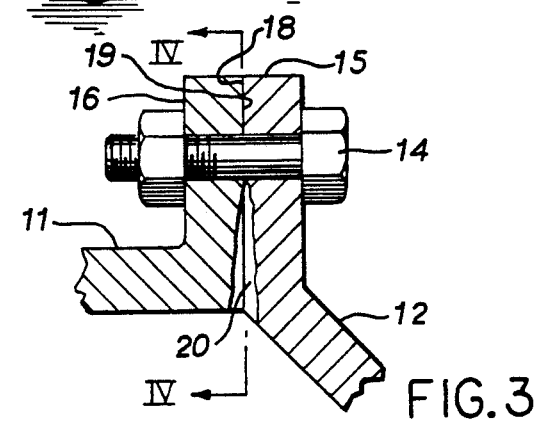
FIG. 3 is a cross section view showing the same joint after substantial wear.
Figure 4:
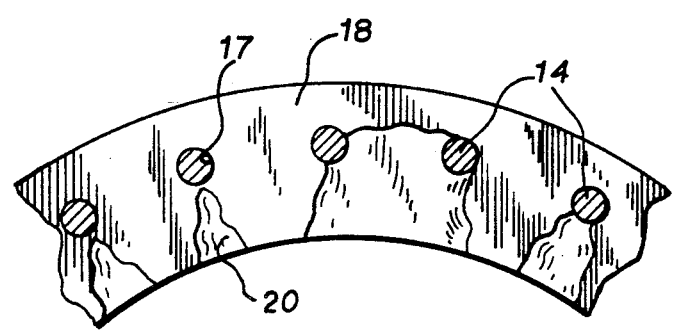
FIG. 4 is a front view of a portion of the flange showing the damaged surfaces.
Figure 5:
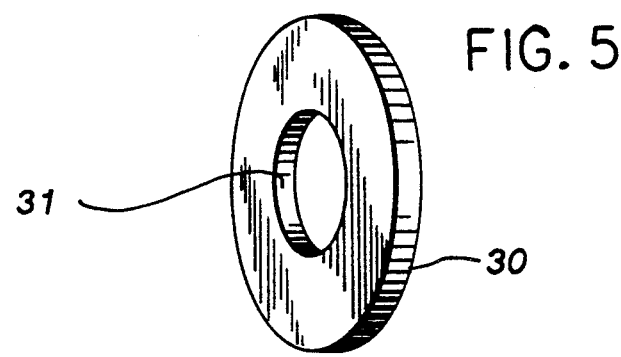
FIG. 5 is a spacer for insertion into the void formed by the counterboring.
Figure 6:
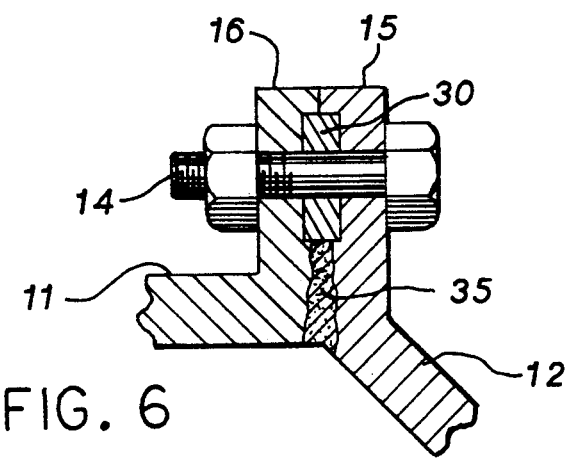
FIG. 6 is a cross section view at the repaired joint.

Referring now to the drawings and more specifically to FIG. 1, there is shown a large rotating grinding mill (10) having an elongated cylindrical shell (11) in which material is ground. The shell is connected to a feed end head (12) and a discharge end head (13). The heads are connected to the shell by bolts (14) extending through circumferentially spaced holes (17) in the radially extending flanges (15, 16) on the heads and the shell. The abutting surfaces (18, 19) of the flanges (15, 16) are forced together to form a seal and a solid tight connection to hold the parts together and transfer load from the driving discharge head (13) to the shell (11) and then to the inlet head (12).

The discharge head (13) is connected to a suitable power source, such as a drive motor, through appropriate gearing. Grinding media such as steel balls are placed in the shell and the material to be ground is fed into the shell (11) through an opening (22) in the feed head (12). As the mill is rotated, the material is ground by the balls and discharged through the opening (23) in the discharge head (13).

Mills such as illustrated are often over 36 feet in diameter, 60 feet long and weigh in excess of 100 tons. In addition, the balls and feed can increase the weight of the mill by over 150 tons. The shell alone can weigh up to 60 tons.

Obviously rotating such a large mass applies extreme forces on the bolts (14) and the mating surfaces that transmit forces through the components of the mill. During operation the grinding materials can have an abrasive wearing effect on the joints creating space (20) between the mating flange surfaces (18, 19). As operation continues and the space between the surfaces increases, it allows relative movement between the flanges (15, 16) which in turn causes increased stress on the bolts (14). In severe cases the abrasive action between the flanges can extend to the bolts (14) themselves causing direct abrasive wear on the bolt, thereby reducing the strength of the bolts. Such a condition could lead to failure of the bolts and ultimately to failure of the joint which results in major damage to the mill itself.

When such wear is detected, such as by leakage of fluid through the joints, excessive vibration or bolt breakage, the mill is shut down for repair.

Figure 7:
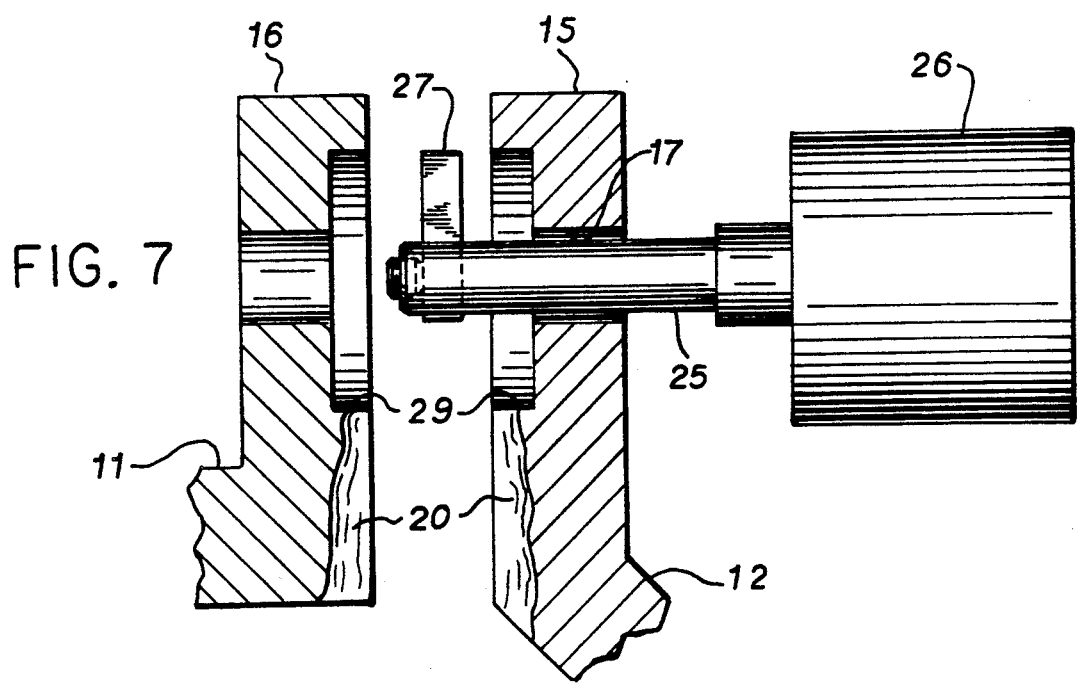
FIG. 7 is a cross-section view showing a boring bar extending through a bolt hole in the flange and having a cutting tool attached for counterboring the surface surrounding the bolt hole.

When it is decided to repair the mill, the shell and the head are blocked for support and all the bolts are removed. The head is then moved axially at least one to two inches to permit the insertion of a cutting tool between the flanges As shown in FIG. 7, a boring bar (25) attached at one end to a suitable motor (26) is extended through one of the bolt holes (17) so that the other end extends into the space between the flanges (15, 16). A cutting tool (27) is then attached to the end of the bar by any suitable means. The boring bar and cutting tool is rotated by the motor and moved axially through the bolt hole (17) to cause the cutting tool to engage and machine the flange surface surrounding the bolt hole to form an annular cavity (29). This operation continues until a smooth machined surface surrounds at least 90% of the area around the bolt hole.

This operation is repeated for all the bolt holes (14) on flange (15) that have eroded surfaces adjacent to the bolt holes. Then the boring bar (25) and related equipment are moved to the other side of flange (16) and the machining operations described above are repeated for each worn surface on flange (16). It is preferred that where erosion has occurred the flange surfaces surrounding aligned bolt holes both be machined to form an annular cavity that extends partially into each flange.

Annular spacer units (30) are then inserted in the cavities (29) formed by the machining. It is essential that the width of the spacers is equal to the combined depth of the facing counterbores (29) so that upon reassembly the facing surfaces of the flanges will engage in a sealing relationship. Also, the spacers have a bore (31) that is the same diameter as the bolt holes. The outer diameter of the counter bore cavities (29) into which the spacer will be inserted is slightly larger than the diameter of the spacers (30). The spacers (30) should be made of a material similar to the material of the flanges so that when reassembled, substantially the same amount of thrust can be transmitted between the heads (12, 13) and the shell (11).

After all of the spacers (30) have been inserted, the flanges are rebolted. Any space left between the flanges at the radially inner portion of the joints is filled with an appropriate wear resistant sealing material (35) such as epoxy to retard any further erosion of the joint.

The embodiments of the invention in which an exclusive property or privilege is claimed are defined as follows:

1. A method of repairing a large rotary device made up of sections having adjacent radially extending flanges forced together by a bolt extending through aligned bores in said flanges which force surfaces of said flanges into an abutting and sealing force transmitting relationship, the method of comprising the steps of:
    (a) removing said bolts and separating said adjacent flanges;
    (b) counterboring each surface surrounding said aligned bores to a depth less than the width of its respective flange, thereby forming a counterbore in each surface;
    (c) inserting an annular spacer of material having similar thrust transmitting capability to the material of said flanges into the counterbores, the inner diameter of said spacer being at least the equal to the diameter of said bores, the outer diameter of said spacer being less than the diameter of the counterbores, and the thickness of said spacer being equal to the combined depths of the counterbores;
    (d) bolting said flanges together, thereby forming a seal and thrust transmitting drive between the abutting surfaces of said flanges and between said flanges and said spacer.

2. The method of claim 1 wherein said flanges have a series of arcuately spaced bore.

3. The method of claim 2 wherein said counterboring step includes counterboring such that a smooth machined surface surrounding at least 90 percent of the area around the bores in said flanges is provided.

* * * * *